A. H. SWEET.
CLUTCH.
APPLICATION FILED AUG. 24, 1915.
1,242,389.
Patented Oct. 9, 1917.
2 SHEETS—SHEET 1.
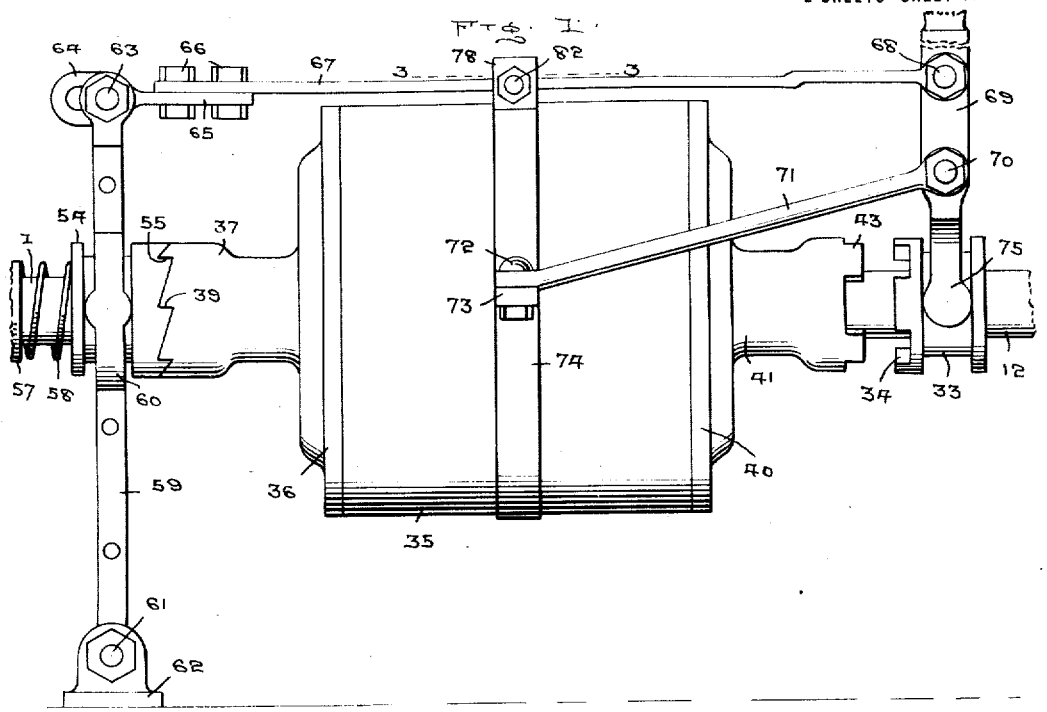
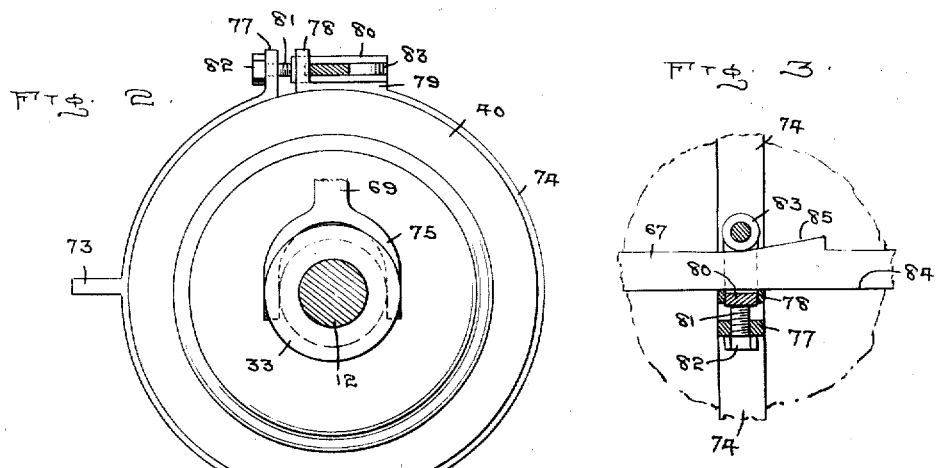
A. H. Sweet — Inventor
Witnesses
Thos. W. Riley
J. H. Reid.
By W. J. FitzGerald
Attorney

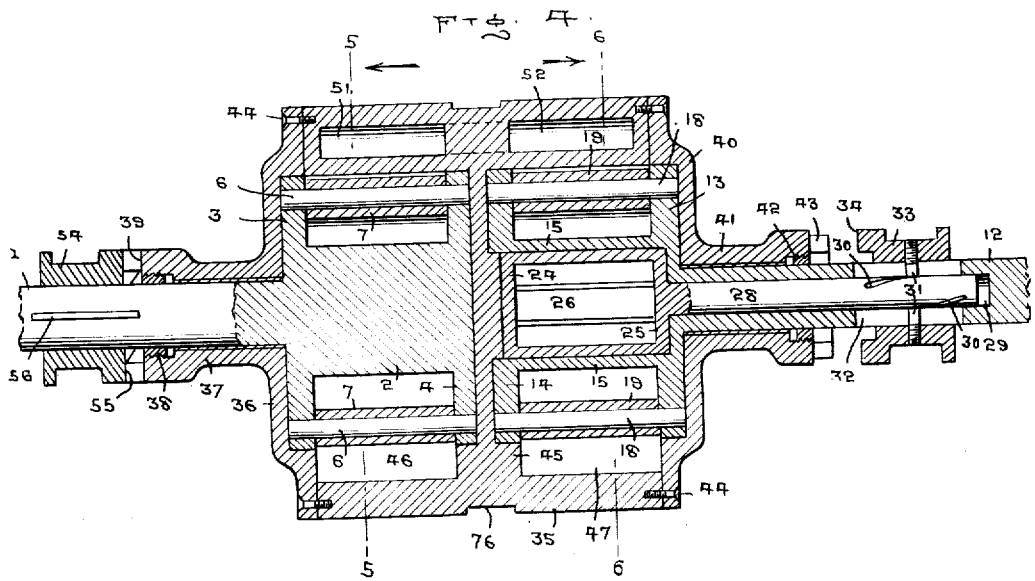
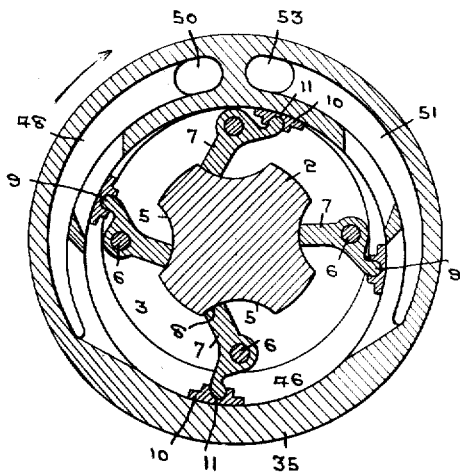
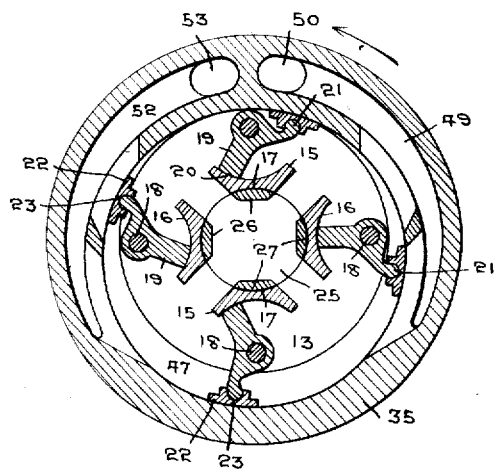

UNITED STATES PATENT OFFICE.

ALLEN H. SWEET, OF ST. LOUIS, MISSOURI, ASSIGNOR TO SWEET POWER TRANSMISSION COMPANY, OF ST. LOUIS, MISSOURI, A CORPORATION OF MISSOURI.

CLUTCH.

1,242,389.

Specification of Letters Patent.

Patented Oct. 9, 1917.

Application filed August 24, 1915. Serial No. 47,093.

*To all whom it may concern:*

Be it known that I, ALLEN HERBERT SWEET, a citizen of the United States, residing at St. Louis, in the county of St. Louis City and State of Missouri, have invented certain new and useful Improvements in Clutches; and I do hereby declare the following to be a full, clear, and exact description of the invention, such as will enable others skilled in the art to which it appertains to make and use the same.

This invention relates to clutches and more particularly to that type of clutches known as hydraulic or fluid clutches, and has for one of its objects, the provision of a clutch capable of use in connection with combustion engines, power shafting, and all kinds of machinery wherein a clutch may be used as a connecting medium between the operating parts.

Another object of this invention resides in the provision of a clutch provided with means for establishing a gradual connection between its members until the members rotate in unison and subsequently rigidly locking the parts together.

A still further object of this invention resides in the provision of a fluid clutch whereby either of its members may be mounted on either the driving shaft or the driven shaft with equal degrees of efficiency and use in connection with the two part shaft.

A still further object of this invention resides in the provision of a fluid clutch provided with means for establishing a connection between a driving shaft and a driven shaft for revolving the shafts in the same direction.

A still further object of this invention resides in the provision of a fluid clutch provided with means for reversing the action of the clutch for revolving the driven shaft in the reverse direction of the driving shaft.

And a still further object of this invention resides in the provision of a reversible fluid clutch, which is simple in construction, efficient and durable in operation, and which can be manufactured at a nominal cost.

Other objects and advantages of this invention will be hereinafter clearly set forth in the specification, defined in the claims, and illustrated in the accompanying drawings, in which, Figure 1 is a side view of the clutch,
Fig. 2 is an end view partly in section,
Fig. 3 is a fragmentary detail view, partly in section, on line 3—3 of Fig. 1,
Fig. 4 is a vertical longitudinal sectional view showing the interior construction of the clutch,
Fig. 5 is a vertical sectional view on line 5—5 of Fig. 4 looking in the direction of the arrow,
Fig. 6 is a vertical sectional view on line 6—6 of Fig. 4 looking in the direction of the arrow, Referring to the drawings, 1 denotes the driving shaft, which may be driven by any suitable source of power. Upon the end of the shaft 1 is a rotor consisting of the hub 2, provided at its ends with the annular flanges 3 and 4, the hub 2 is also provided with the longitudinally extending and transversely curved grooves 5 upon its outer faces. Extending from the flange 3 and the flange 4 and having their ends mounted in the flanges 3 and 4 adjacent their peripheries are the pivot rods 6, and upon the rods 6 are pivotally mounted the blades 7. The blades 7 have their inner edges slightly rounded as at 8 for snugly engaging the curved surfaces of the grooves 5 of the hub 2 of the rotor. The outer edges of the blades 7 are provided with the substantially circular beads 9, upon which are pivotally mounted the wear plates or shoes 10, provided with the grooves 11 for embracing the beads 9 of the blades 7.

12 designates a driven shaft, upon the end of which is mounted the cage or inner clutch member. This cage or inner clutch member consists of the disk 13 mounted upon the end of the driven shaft 12, and the ring 14. The disk 13 and the ring member 14 are connected together at points remote from their peripheries by the spaced bars 15. The bars 15 are provided with the longitudinally disposed and transversely curved grooves 16 upon their outer faces, and also with the longitudinally disposed and transversely curved grooves 17 in their inner faces. Extending from the disk 13 and the ring member and having their ends mounted in the disks 13 and the ring member 14 and adjacent their peripheries are the rods 18, upon which are pivotally mounted the blades 19, having their inner edges rounded as at 20 for snugly engaging the curved surfaces of the grooves 16 of the bars 15 of the cage. The outer edges of the blades 19 are provided with the substantially circular beads 21, upon which are pivotally mounted the wear plates or shoes 22, provided with grooves 23 for embracing the beads 21 of the blades.

Rotatably mounted within the cage is a valve comprising the end disks 24 and 25. The disks 24 and 25 are connected at their peripheries by the spaced bars 26, having their outer faces transversely convexed as at 27, for snugly engaging the inner concave grooves 17 of the bars 15 of the cage. Upon the disk 25 of the valve, is the valve stem 28 projecting into the bore 29 of the driven shaft 12. The valve stem 28 is provided adjacent its outer end with the oppositely disposed and substantially spiral slots 30, each of which extend around the periphery of the valve stem 28 for substantially one-fourth of the distance therearound, and projecting into the slots 30 are the inner ends of the pins 31, which pins project through the longitudinally elongated slot 32 which extends transversely through the driven shaft 12. The outer ends of the pins 31 are secured in the collar 33, provided with the clutch face 34.

Surrounding the rotor and the inner clutch member is the casing 35, provided with the end plate 36, formed with the hub 37 loosely surrounding the driving shaft 1. The outer end of the hub 37 is provided with the packing box 38 and the clutch face 39. At the opposite end of the casing 35 is the end plate 40 provided with the hub 41. The end of the hub 41 is provided with the packing box 42 and the clutch face 43. The end plates 36 and 40 are secured to the casing 35 by the screw bolts 44 or other suitable fastening means.

The casing 35 is provided with the partition or central wall 45, which divides the casing into two compartments 46 and 47, the rotor operating within the compartment 46, and the inner clutch member operating within the compartment 47.

The compartments 46 and 47 are formed eccentrically within the casing 35, and within the one side wall of the casing 35 and leading from the lower portion of the compartment 46 toward the upper side of the casing 35 is the port 48, and also formed in the same side wall of the casing 35 and extending from the lower portion of the compartment 47 and toward the upper side of the casing 35, is the port 49, the ports 48 and 49 being connected by the port 50, formed through the upper portion of the partition or central wall 45.

At the opposite side wall of the casing 35, and also extending from the lower portion of the compartment 46 to the upper side of the casing 35, is the port 51 and also in this same side wall of the casing 35 and extending from the lower portion of the compartment 47 and the upper side of the casing 35 is the port 52, the port 51 and the port 52 being connected by port 53 which is also formed through the upper portion of the partition or central wall 45 and adjacent to the port 50.

Slidably mounted upon the driving shaft 1 is the collar 54 provided with the clutch face 55. The collar 54 is keyed upon the shaft 1 through the medium of the key 56, whereby the collar 54 rotates with the driving shaft 1. Upon the driving shaft 1 in proximity to the collar 54 is the collar 57, between which and the collar 54 is the compression spring 58 for normally retaining the clutch face 55 of the collar 54 in engagement with the clutch face 39 of the hub 37 of the casing, and for actuating the collar 54 against the action of the spring 58 for disengaging the clutch face 55 of the collar 54 from the clutch face 39 of the hub 37, an arm 59 is employed. The arm 59 is provided with the loop 60 for engaging the annular groove formed in the sleeve 54, and has its lower end pivoted as at 61 to a suitable base 62. The upper end of the arm 59 is pivotally and slidably mounted as at 63 in the elongated link 64 provided at the free end of the short connecting bar 65, which latter is adjustably connected as at 66 with the main connecting bar 67, pivoted as at 68 to the lever 69, the lever 69 being pivoted as at 70 to the free end of the supporting rod 71, the supporting rod 71 being secured as at 72 to the projection or nib 73 formed upon the side of the brake band 74, the lever 69 being provided at its lower end with the fork 75 for engaging the annular groove formed in the collar 33 upon the driven shaft 12.

The brake band 74 surrounds the casing 35, which latter is provided with the annular recess 76 in which the brake band 74 is loosely seated.

The brake band 74 is formed of a strip having one end provided with the apertured ear 77 and the other end formed with the apertured ear 78 in juxtaposition to the apertured ear 77, and at one side of the ear 78 is the flat base member 79. Slidably mounted upon the base member 79 and through the aperture of the ear 78 is the bifurcated plate 80. This plate is provided at one end with the screw threaded bolt 81 which projects through the aperture of the ear 77 and has screw threaded thereon the nut 82, and mounted in the bifurcated end of the plate 80 is the anti-friction roller 83. The main connecting bar 67 passes through the bifurcated plate 80 with the straight side 84 of the bar bearing against the ear 78 of the brake band 74, while the opposite straight side of the main connection bar 67 is normally in contact with the anti-friction roller 83 of the slidable plate 80. Formed upon the opposite straight edge of the bar 67, which normally bears against the anti-friction roller 83, and in proximity to the roller 83, is the wedge or inclined faced lug 85.

The operation of the device is as follows: In Fig. 1 the parts are shown in the position they assume when the clutch is in inoperative position, with the clutch collar 33 in neutral position, and the clutch collar 54 normally engaging the hub 37 of the casing 35, being held in this position through the action of the spring 58, whereby upon the starting of the engine, or other power, the driving shaft 1, the rotor, and the casing 35 will revolve simultaneously and the driven shaft 12, owing to the valve of the inner clutch member being open, will remain stationary. To start the driven shaft 12 to revolve in the direction of the driving shaft 1, the handle of the clutch lever 69 is moved toward the right, whereby the clutch collar 33 is moved inwardly and the pins 31 traveling in the slots 30 of the valve stem 28 begins to close the valve for preventing the fluid in the casing 35 from traveling back and forth through the inner clutch member. The gradual closing of the valve begins to form a clutching action between the inner clutch member and the interior walls of the compartment 47 of the casing 35 whereupon the inner clutch member, its valves and the driven shaft 12 begin to rotate until the final closing of the valve whereby the inner clutch member and the driven shaft 12 will rotate in unison with the driven shaft 1 and the casing 35. Upon the continued movement of the clutch collar 33, the clutch face thereof will be moved into engagement with the clutch face 43 of the hub 41 of the casing 35 and thus form a rigid locking or clutch connection.

Should it be desirous or necessary to reverse the direction of the driven shaft 12 with respect to the direction of the driving shaft 1, and without stopping the engine or other source of power, the handle of the clutch lever 69 is moved toward the left and this movement moves the clutch collar 33 back to its neutral position, as shown in Fig. 4, which movement again opens the valve of the inner clutch member and the clutching action between the inner clutch member and the casing 35 is released. At the same time, this movement of the lever toward the left forces the connecting rod 67 in the same direction whereupon the inner end of the slotted link 64 forces the arm 59 also toward the left, and this movement of the arm 59 forces the clutch collar 54 against the action of the spring 58 and thus disengages the clutch face 55 and the collar 54 from the clutch face 39 of the hub 37 of the casing 35, and substantially simultaneously therewith, the inclined faced lug 85 upon the connecting bar 67 forces the sliding plate 80 outwardly, forming a wedging action between the roller 83 and the ear 78, and this movement draws the ear 77 inwardly toward the ear 78 and this causes the brake band 74 to bind against the periphery of the casing 35 and brakes or stops the same. At this stage the casing 35 is held immovable and the rotor upon the driving shaft 1 which operates within the compartment 46 of the casing, continues to rotate. This movement of the clutch lever 69 toward the left also moves the clutch collar 33 outwardly beyond the neutral point upon the valve stem 28, and this movement of the collar 33 causes the pins 31 to travel in the opposite direction in the slots 30 to that hereinbefore described. This movement throws the valve in the opposite direction for closing the same. In this latter position of the respective parts of the clutch blades 7, the rotor will drive the fluid through the port 48 of the casing through the connecting port 50 and into the port 49 of the clutch, whereby the force of impact of the fluid against the blades 19 of the inner clutch member, will cause the inner clutch member, its valve and the driven shaft 12, to revolve in the opposite direction to that of the driving shaft 1, the fluid passing through the compartment 47 of the clutch mechanism through the port 52 and the connecting port 53 and the port 51 back into the compartment 46 in which the rotor operates. This operation will continue to run the driven shaft in a reverse direction until the clutch lever 69 is moved back to neutral position as clearly shown in Fig. 4, and upon this movement of the lever 69 the connecting rod 67 will be returned to normal neutral position thereby releasing the binding action of the brake band 74 upon the casing 35, and through the action of the spring 58 the clutch face of the collar 54 will reëngage the clutch face of the hub 37 of the casing 35, whereby the respective parts will assume their normal inoperative position. The lever 69 may then be moved to the right in a manner as before described for causing the driven shaft 12 to revolve in the same direction as the driving shaft 1, and without the necessity of stopping the engine or other source of power.

While I have here shown and described the preferred embodiment of my invention, I do not wish to be limited to the exact construction as minor alterations and variations may be made therein from time to time which will neither depart from the spirit of the invention nor the scope of the claims.

Having described my invention what I claim as new and desire to secure by Letters-Patent is:—

1. In a power transmitting device, the combination of a casing having two cylindrical coaxial chambers therein, a shaft, a rotor eccentrically mounted within one chamber and carried on an end of the shaft, pivoted substantially balanced blades carried by the rotor dividing the interspace into compartments, a second shaft, a rotatable member having a central compartment eccentrically positioned within the other chamber and carried by the second shaft, said member having a plurality of radial ports opening from said compartment to the eccentric interspace provided between the member and casing, pivoted substantially balanced blades carried by the member dividing the interspace into compartments into which respectively the ports open, a cylindrical valve having radial ports mounted within said compartment for rotation with and with respect to said member, ports connecting substantially diametrically opposite parts of one chamber with similar positioned parts of the other chamber, means for rotating said valve with respect to the member, a substantially non-compressible fluid filling the spaces within the casing, means for clutching the first mentioned shaft to the casing, and means operable on unclutching the shaft and casing for holding the casing from rotation.

2. In a power transmitting device, the combination of a casing having two cylindrical coaxial chambers therein, a shaft, a rotor eccentrically mounted within one chamber and carried on an end of the shaft, pivoted substantially balanced blades carried by the rotor dividing the interspace into compartments, a second shaft, a rotatable member having a central compartment eccentrically positioned within the other chamber and carried by the second shaft, said member having a plurality of radial ports opening from said compartment to the eccentric interspace provided between the member and casing, pivoted substantially balanced blades carried by the member dividing the interspace into compartments into which respectively the ports open, a cylindrical valve having radial ports mounted within said compartment for rotation with and with respect to said member, ports connecting substantially diametrically opposite parts of one chamber with similar positioned parts of the other chamber, means for rotating said valve with respect to the member, a substantially non-compressible fluid filling the spaces within the casing, means for clutching the first mentioned shaft to the casing, means operable on the rotation of the valve with respect to its member for subsequently clutching the second mentioned shaft to the casing, and means operable on the unclutching of the first mentioned shaft and casing for holding the casing from rotation.

3. In a power transmitting device, the combination of a casing having two cylindrical coaxial chambers therein, a shaft, a rotor eccentrically mounted within one chamber and carried on an end of the shaft, pivoted substantially balanced blades carried by the rotor dividing the interspace into compartments, a second shaft, a rotatable member having a central compartment eccentrically positioned within the other chamber and carried by the second shaft, said member having a plurality of radial ports opening from said compartment to the eccentric interspace provided between the member and casing, pivoted substantially balanced blades carried by the member dividing the interspace into compartments into which respectively the ports open, a cylindrical valve having radial ports mounted within said compartments for rotation with and with respect to said member, ports connecting substantially diametrically opposite parts of one chamber with similar positioned parts of the other chamber, means for rotating said valve with respect to the member, a substantially non-compressible fluid filling the spaces within the casing, means for clutching the first mentioned shaft to the casing, means for stopping rotation of the casing, means for clutching the second mentioned shaft to the casing, and means operable on the unclutching of the first mentioned shaft and casing for actuating the casing stopping means.

4. In a power transmitting device, the combination of a casing having two cylindrical coaxial chambers therein, a shaft, a rotor eccentrically mounted within one chamber and carried on an end of the shaft, pivoted substantially balanced blades carried by the rotor dividing the interspace into compartments, a second shaft, a rotatable member having a central compartment eccentrically positioned within the other chamber and carried by the second shaft, said member having a plurality of radial ports opening from said compartment to the eccentric interspace provided between the member and casing, pivoted substantially balanced blades carried by the member dividing the interspace into compartments into which respectively the ports open, a cylindrical valve having radial ports mounted within said compartments for rotation with and with respect to said member, ports connecting substantially diametrically opposite parts of one chamber with similar positioned parts of the other chamber, means for rotating said valve with respect to the member, a substantially non-compressible fluid filling the spaces within the casing, means for clutching the first mentioned shaft to the casing, means for stopping rotation of the casing, means for clutching the second mentioned shaft to the casing, and means operable on the rotation of the valve to close the same for subsequently actuating the second shaft and casing clutching means.

5. In a power transmitting device, the combination of a casing having two cylindrical coaxial chambers therein, a shaft, a rotor eccentrically mounted within one chamber and carried on an end of the shaft, pivoted substantially balanced blades carried by the rotor dividing the interspace into compartments, a second shaft, a rotatable member having a central compartment eccentrically positioned within the other chamber and carried by the second shaft, said member having a plurality of radial ports opening from said compartment to the eccentric interspace provided between the member and casing, pivoted substantially balanced blades carried by the member dividing the interspace into compartments into which respectively the ports open, a cylindrical valve having radial ports mounted within said compartment for rotation with and with respect to said member, ports connecting substantially diametrically opposite parts of one chamber with similar positioned parts of the other chamber, means for rotating said valve with respect to the member, a substantially non-compressible fluid filling the spaces within the casing, a clutch normally closed for connecting the first mentioned shaft with the casing, means for stopping rotation of the casing, a second clutch for connecting the second mentioned shaft to the casing, a hand lever operable in two directions, and connections between the hand lever and the clutches, the valve and casing stop for closing the valve and subsequently engaging the second mentioned clutch when the lever is moved in one direction, and for closing the valve disengaging the first mentioned clutch and actuating the casing stop when moved in the other direction.

In testimony whereof I have signed my name to this specification in the presence of two subscribing witnesses.

ALLEN H. SWEET.

Witnesses:
CHAS. BACHAR,
JOHN A. PALMER.